(12) United States Patent
Itoh

(10) Patent No.: US 11,782,551 B2
(45) Date of Patent: Oct. 10, 2023

(54) CONDUCTIVE MEMBER FOR TOUCH PANEL AND TOUCH PANEL

(71) Applicant: FUJIFILM Corporation, Tokyo (JP)

(72) Inventor: Shigehide Itoh, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/050,347

(22) Filed: Oct. 27, 2022

(65) Prior Publication Data
US 2023/0176683 A1 Jun. 8, 2023

(30) Foreign Application Priority Data
Nov. 24, 2021 (JP) .................................. 2021-190001

(51) Int. Cl.
| | | |
|---|---|---|
| *G06F 3/01* | (2006.01) | |
| *G09G 3/00* | (2006.01) | |
| *B60Q 1/26* | (2006.01) | |
| *G06F 3/0485* | (2022.01) | |
| *G06F 3/041* | (2006.01) | |

(52) U.S. Cl.
CPC ................. *G06F 3/04164* (2019.05); *G06F 2203/04103* (2013.01)

(58) Field of Classification Search
CPC ................. G06F 3/04164; G06F 2203/04103
USPC ........................................................ 345/173
See application file for complete search history.

(56) References Cited

U.S. PATENT DOCUMENTS
2022/0397970 A1* 12/2022 Nonami ................ G06F 3/0446

FOREIGN PATENT DOCUMENTS
JP 2016-194746 A 11/2016

* cited by examiner

*Primary Examiner* — Mark Edwards
(74) *Attorney, Agent, or Firm* — Edwards Neils LLC; Jean C. Edwards, Esq.

(57) ABSTRACT

A conductive member for a touch panel includes: a substrate; and a conductive layer that is disposed on at least one surface of the substrate, in which the conductive layer includes a plurality of detection electrodes and a plurality of lead wires led from the plurality of detection electrodes, an end part of the lead wire in a width direction is thicker than a center portion of the lead wire in the width direction, and a ratio of a thickness of the end part of the lead wire to a thickness of the center portion of the lead wire is 1.50 or more.

8 Claims, 3 Drawing Sheets

CONDUCTIVE MEMBER FOR TOUCH PANEL AND TOUCH PANEL

CROSS-REFERENCE TO RELATED APPLICATIONS

The present application claims priority under 35 U.S.C. § 119 to Japanese Patent Application No. 2021-190001 filed on Nov. 24, 2021. The above application is hereby expressly incorporated by reference, in its entirety, into the present application.

BACKGROUND OF THE INVENTION

1. Field of the Invention

The present invention relates to a conductive member for a touch panel that is used as an electrode for detecting a touch operation.

In addition, the present invention also relates to a touch panel including the conductive member for a touch panel.

2. Description of the Related Art

In the related art, in various electronic apparatuses including portable information apparatuses such as a tablet computer or a smartphone, a touch panel where an input operation to an electronic apparatus can be performed through a so-called touch operation of allowing a finger, a stylus pen, or the like to contact or approach a screen is used.

For example, as disclosed in JP2016-194746A, this touch panel includes a conductive member including: a plurality of detection electrodes for detecting the touch operation; and a plurality of lead wires that are led from the plurality of detection electrodes.

SUMMARY OF THE INVENTION

Incidentally, during manufacturing or subsequent handling, for example, in a case where an elongated substrate on which a plurality of conductive members are formed is wound in a roll or in a case where a plurality of conductive members are laminated, the conductive member disclosed in JP2016-194746A may be rubbed with a thing such as another conductive member. In this case, in a case where the plurality of lead wires are rubbed, there may be a failure such as an increase in the resistance value of the conductive member.

The present invention has been made to solve the problems in the related art, and an object thereof is to provide a conductive member for a touch panel where a failure caused by scratching on a lead wire can be suppressed, and a touch panel including the conductive member for a touch panel.

According to an aspect of the present invention, there is provided a conductive member for a touch panel comprising: a substrate; and a conductive layer that is disposed on at least one surface of the substrate, in which the conductive layer includes a plurality of detection electrodes and a plurality of lead wires led from the plurality of detection electrodes, an end part of the lead wire in a width direction is thicker than a center portion of the lead wire in the width direction, and a ratio of a thickness of the end part of the lead wire to a thickness of the center portion of the lead wire is 1.50 or more.

It is more preferable that the ratio of the thickness of the end part of the lead wire to the thickness of the center portion of the lead wire is 1.55 or more.

In addition, it is preferable that a line width of the lead wire is 3.0 μm or more and 30.0 μm or less.

The thickness of the end part may be a maximum thickness of the lead wire in a range of a predetermined distance from a side edge surface of the lead wire in the width direction to the center portion.

The predetermined distance may be 1.0 μm.

It is preferable that the conductive layer includes a plurality of external connection terminals connected to the plurality of lead wires, an end part of the external connection terminal in a width direction is thicker than a center portion of the external connection terminal in the width direction, and a ratio of a thickness of the end part of the external connection terminal to a thickness of the center portion of the external connection terminal is 1.50 or more.

It is preferable that the substrate is a transparent insulating substrate.

According to another aspect of the present invention, there is provided a touch panel comprising the above-described conductive member for a touch panel.

The conductive member for a touch panel according to the aspect of the present invention comprises: a substrate; and a conductive layer that is disposed on at least one surface of the substrate, in which the conductive layer includes a plurality of detection electrodes and a plurality of lead wires led from the plurality of detection electrodes, an end part of the lead wire in a width direction is thicker than a center portion of the lead wire in the width direction, and a ratio of a thickness of the end part of the lead wire to a thickness of the center portion of the lead wire is 1.50 or more. Therefore, a failure caused by rubbing of a lead wire can be suppressed.

DESCRIPTION OF THE PREFERRED EMBODIMENTS

Hereinafter, a conductive member for a touch panel and a touch panel according to the present invention will be described in detail based on a suitable embodiment shown in the accompanying drawings.

In the following description, a numerical range indicated by the expression "to" includes numerical values described on both sides. For example, in a case where "s is a numerical value t1 to a numerical value t2", the range s is a range including the numerical value t1 and the numerical value t2, which is expressed by a mathematical symbol $t1 \leq s \leq t2$.

Unless specified otherwise, the meaning of an angle such as "perpendicular" or "parallel" includes a case where an error range is generally allowable in the technical field.

"Transparent" represents that a light transmittance in a visible wavelength range of 400 nm to 800 nm is at least 40% or more, preferably 75% or more, more preferably 80% or more, and still more preferably 90% or more. The light transmittance is measured using "Plastics—Determination of Total Luminous Transmittance And Reflectance" defined by JIS K 7375:2008.

Embodiment

Figure 1:
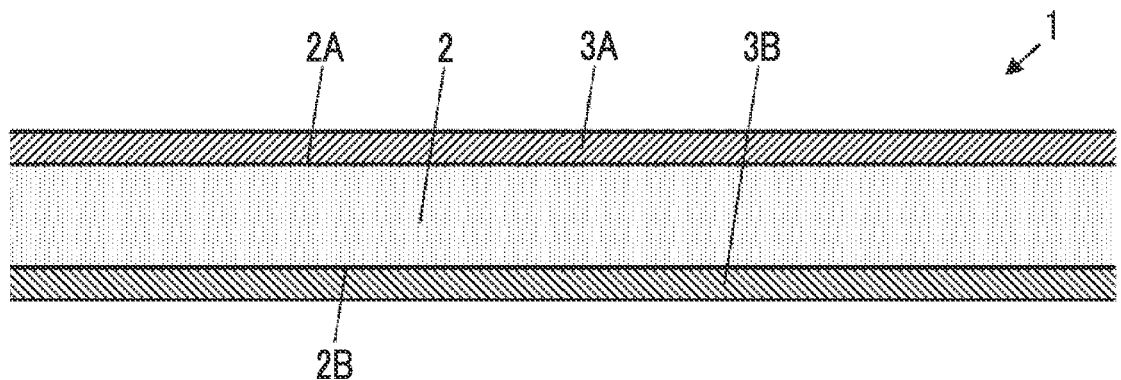
FIG. 1 is a partial cross-sectional view showing a conductive member for a touch panel according to a first embodiment.

FIG. 1 shows a configuration of a conductive member 1 for a touch panel according to the embodiment of the present invention.

The conductive member 1 for a touch panel includes: a substrate 2 that includes a first surface 2A and a second surface 2B forming the front and the back; a first conductive layer 3A that is disposed on the first surface 2A of the substrate 2; and a second conductive layer 3B that is disposed on the second surface 2B of the substrate 2. The substrate 2 has insulating properties, and the first conductive layer 3A and the second conductive layer 3B are electrically insulated from each other.

In the conductive member 1 for a touch panel, a cover member (not shown) is bonded to a surface on the first conductive layer 3A side, and a display module (not shown) is bonded to a surface on the second conductive layer 3B side. As a result, the conductive member 1 for a touch panel can be used as a touch panel display device (not shown). In this case, a finger, a stylus pen, or the like of a user that contacts or approaches the cover member is detected, and a touch operation by the user is detected.

Figure 2:
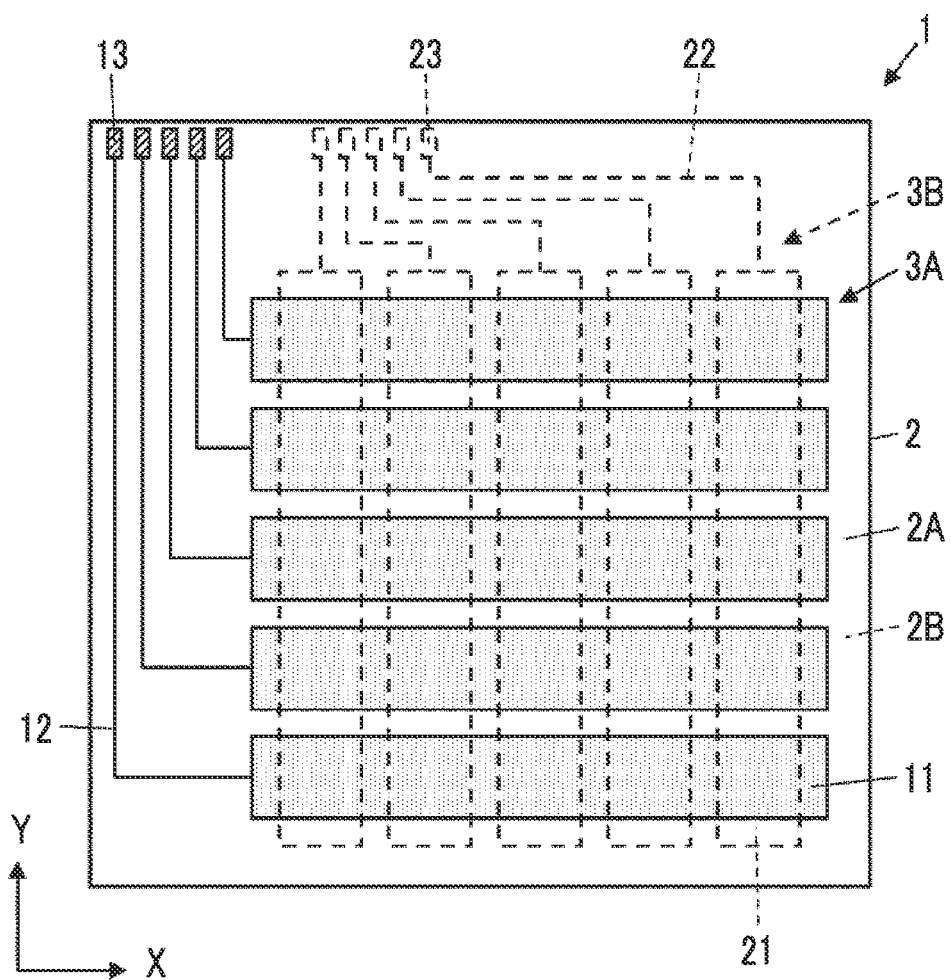
FIG. 2 is a plan view showing the conductive member for a touch panel according to the first embodiment.

FIG. 2 is a plan view showing the conductive member 1 for a touch panel.

The first conductive layer 3A includes: a plurality of first detection electrodes 11 for detecting a touch operation that extend in a predetermined X direction and are arranged in a Y direction perpendicular to the X direction; a plurality of first lead wires 12 that are electrically connected to the plurality of first detection electrodes 11; and a plurality of first external connection terminals 13 that are electrically connected to the plurality of first lead wires 12.

The second conductive layer 3B includes: a plurality of second detection electrodes 21 for detecting a touch operation that extend in the Y direction and are arranged in the X direction; a plurality of second lead wires 22 that are electrically connected to the plurality of second detection electrodes 21; and a plurality of second external connection terminals 23 that are electrically connected to the plurality of second lead wires 22.

A region where the plurality of first detection electrodes 11 are disposed and a region where the plurality of second detection electrodes 21 are disposed overlap each other with the substrate 2 interposed therebetween in a Z direction perpendicular to both of the X direction and the Y direction.

Figure 3:
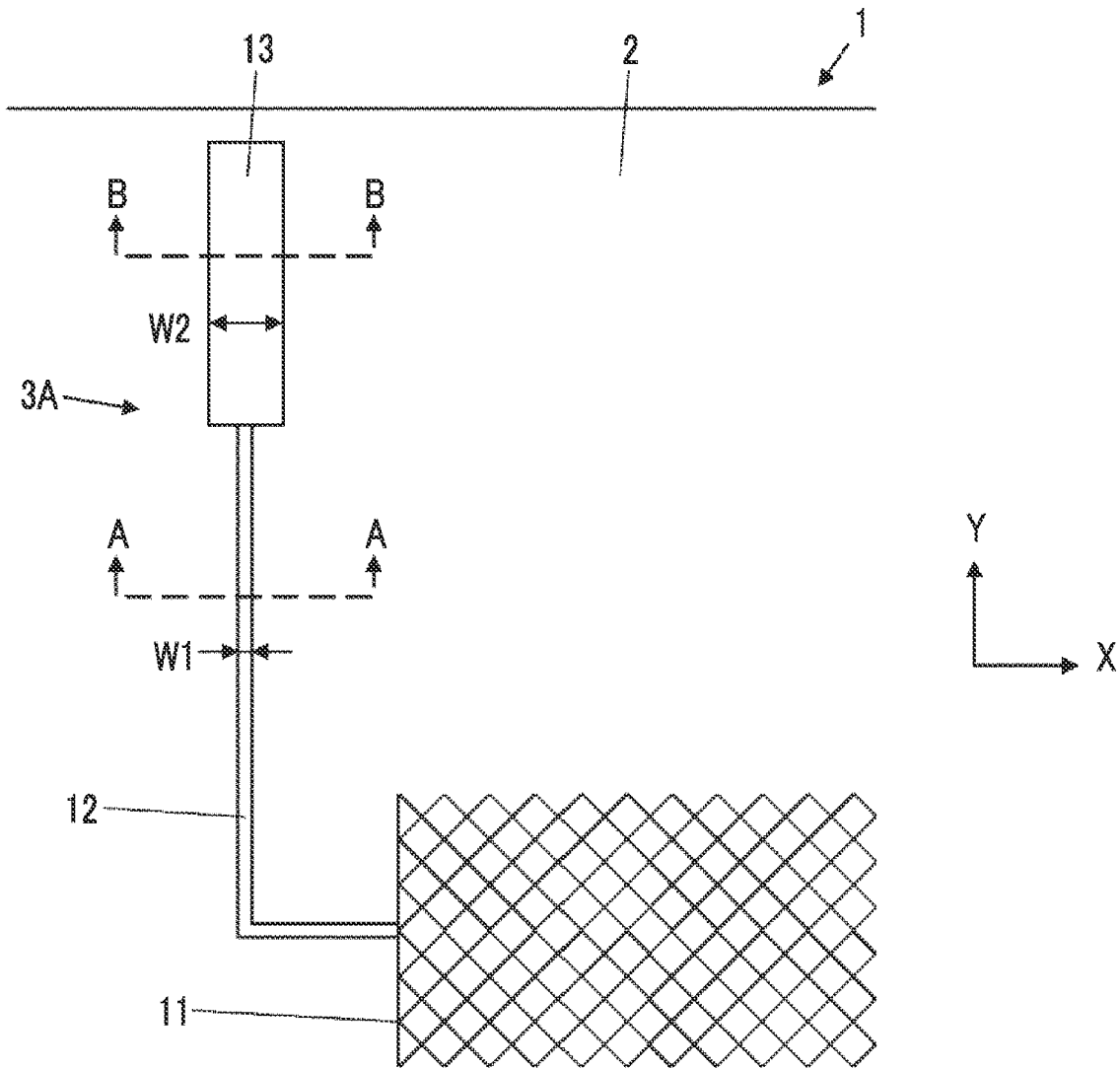
FIG. 3 is an enlarged view showing a part of a first conductive layer according to the first embodiment.

FIG. 3 is an enlarged view showing a part of a first conductive layer according to the first embodiment. The first lead wire 12 has a line width W1 of, for example, 3.0 μm or more and 30.0 μm or less. In addition, the first external connection terminal 13 has a terminal width W2 of, for example, 300.0 μm or more and 500.0 μm or less. For convenience of description, FIG. 3 shows only one set including the first detection electrode 11, the first lead wire 12, and the first external connection terminal 13.

Figure 4:
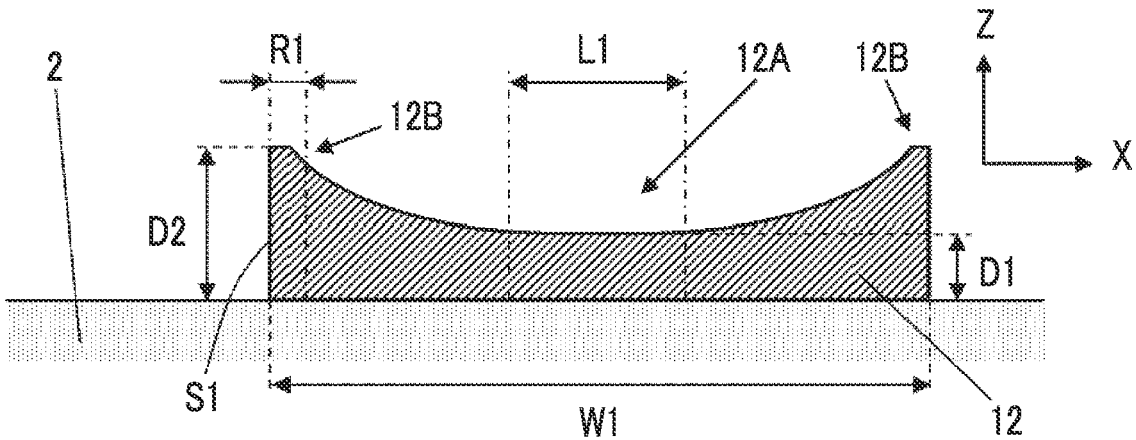
FIG. 4 is a cross-sectional view showing a first lead wire according to the first embodiment.

FIG. 4 is a cross-sectional view showing the first lead wire 12 extending in the Y direction of the first conductive layer 3A taken along line A-A parallel to the X direction in FIG. 3. An end part 12B of the first lead wire 12 in a width direction is thicker than a center portion 12A of the first lead wire 12 in the width direction, and a ratio of a thickness D2 of the end part 12B of the first lead wire 12 to a thickness D1 of the center portion 12A of the first lead wire 12 is 1.50 or more. That is, the thickness D1 of the center portion 12A and the thickness D2 of the end part 12B in the first lead wire 12 satisfy Inequality (1).

$$D2/D1 \geq 1.50 \tag{1}$$

Here, the width direction of the first lead wire 12 refers to a direction perpendicular to the direction in which the first lead wire 12 extends. For example, at a position indicated by the line A-A in FIG. 3, the X direction corresponds to the width direction. In addition, as shown in FIG. 4, the end part 12B of the first lead wire 12 can be defined as a by a range R1 of a predetermined distance from a side edge surface S1 of the first lead wire 12 in the width direction to the center portion 12A. The predetermined distance can be set as a value, for example, in a range of 0.5 μm to 1.5 μm.

In addition, the thickness D2 of the end part 12B of the first lead wire 12 is defined as a maximum thickness of the first lead wire 12 in the range R1. In addition, the thickness of the center portion 12A of the first lead wire 12 can be defined as a maximum value, an average value, or the like of the thickness of the first lead wire 12 in a range L1 of a distance predetermined including the center of the first lead wire 12 in the width direction. Here, the predetermined distance in the range L1 can be set as a value, for example, in a range of 0.5 μm to 1.5 μm.

In addition, in a case where the end part 12B of the first lead wire 12 is excessively thick, for example, in a case where the first conductive layer 3A is formed on an elongated substrate 2 and the substrate 2 is wound in a roll, the first lead wire 12 is strongly pressed against the second lead wire 22 formed on the second surface 2B of the substrate 2 such that the first lead wire 12 and the second lead wire 22 may be damaged. Therefore, for example, the thickness D2 of the end part 12B of the first lead wire 12 is preferably 4.00 μm or less and more preferably 3.00 μm or less.

In addition, in a case where the center portion 12A of the first lead wire 12 is excessively thin, there may be a case where, in the first lead wire 12, a conductivity sufficient for using the conductive member 1 for a touch panel as a touch panel display device (not shown) cannot be secured. Therefore, for example, the thickness D1 of the center portion 12A of the first lead wire 12 is preferably 0.40 μm or more and more preferably 0.60 μm or more.

Accordingly, the ratio D2/D1 of the thickness D2 of the end part 12B to the thickness D1 of the center portion 12A in the first lead wire 12 is 1.50 or more as shown in Inequality (1) and is preferably 4.00 μm/0.40 μm=10.00 or less and more preferably 3.00 μm/0.60 μm=5.00 or less.

Incidentally, during manufacturing or subsequent handling, for example, in a case where an elongated substrate on which a plurality of conductive members are formed is wound in a roll or in a case where a plurality of conductive members are laminated, in general, the conductive member such as the conductive member 1 for a touch panel may be rubbed with a thing such as another conductive member. For example, during manufacturing or subsequent handling, the conductive member may be rubbed with a thing such as a working table that is used by a worker.

However, in the conductive member 1 for a touch panel, the end part 12B of the first lead wire 12 in the width direction is thicker than the center portion 12A, and the thickness D1 of the center portion 12A and the thickness D2 of the end part 12B in the first lead wire 12 satisfy Inequality (1). Therefore, due to a difference in height between the center portion 12A and the end part 12B, even in a case where the first lead wire 12 is rubbed with another thing, only the end part 12B of the first lead wire 12 in the width direction is mainly rubbed, the rubbing of the center portion 12A is suppressed, and thus scratching on the center portion 12A is suppressed. The center portion 12A of the first lead wire 12 occupies a larger range in the width direction than the end part 12B. Therefore, by suppressing scratching on the center portion 12A, a failure such as a significant increase in the electric resistance of the first lead wire 12 is suppressed.

Figure 5:
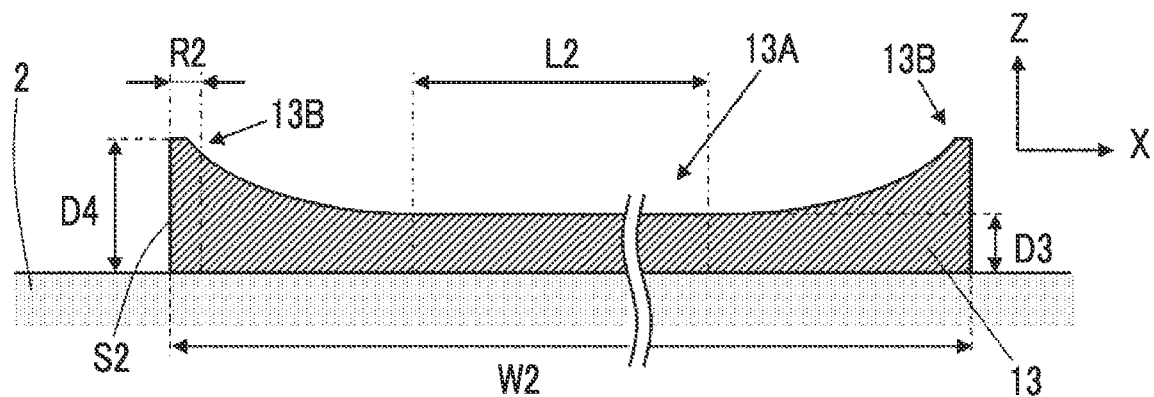
FIG. 5 is a cross-sectional view showing a first external connection terminal according to the first embodiment.

FIG. 5 is a cross-sectional view showing the first external connection terminal 13 of the first conductive layer 3A taken along line B-B parallel to the X direction in FIG. 3. An end part 13B of the first external connection terminal 13 in a width direction is preferably thicker than a center portion 13A of the first external connection terminal 13 in the width direction, and a ratio of a thickness D4 of the end part 13B of the first external connection terminal 13 to a thickness D3 of the center portion 13A in the first external connection terminal 13 is preferably 1.50 or more. That is, the thickness D3 of the center portion 13A and the thickness D4 of the end part 13B in the first external connection terminal 13 preferably satisfy Inequality (2).

$$D4/D3 \geq 1.50 \quad (2)$$

Here, the width direction of the first external connection terminal 13 refers to a direction perpendicular to the direction in which the first external connection terminal 13 extends. For example, at a position indicated by the line B-B in FIG. 3, the X direction corresponds to the width direction. In addition, as shown in FIG. 5, the end part 13B of the first external connection terminal 13 can be defined as a by a range R2 of a predetermined distance from a side edge surface S2 of the first external connection terminal 13 in the width direction to the center portion 13A. The predetermined distance can be set as a value, for example, in a range of 0.5 µm to 1.5 µm.

In addition, the thickness D4 of the end part 13B of the first external connection terminal 13 is defined as a maximum thickness of the first external connection terminal 13 in the range R2. In addition, the thickness of the center portion 13A of the first external connection terminal 13 can be defined as a maximum value, an average value, or the like of the thickness of the first external connection terminal 13 in a range L2 of a distance predetermined including the center of the first external connection terminal 13 in the width direction. Here, the predetermined distance in the range L2 can be set as a value, for example, in a range of 0.5 µm to 1.5 µm.

In addition, as in the thickness D2 of the end part 12B of the first lead wire 12, a thickness D4 of an end part 22B of the second lead wire 22 is preferably 4.00 µm or less and more preferably 3.00 µm or less. In addition, as in the thickness D1 of the center portion 12A of the first lead wire 12, a thickness D3 of a center portion 22A of the second lead wire 22 is preferably 0.40 µm or more and more preferably 0.60 µm or more. Accordingly, the ratio D4/D3 of the thickness D4 of the end part 22B to the thickness D3 of the center portion 22A in the second lead wire 22 is 1.50 or more as shown in Inequality (2) and is preferably 4.00 µm/0.40 µm=10.00 or less and more preferably 3.00 µm/0.60 µm=5.00 or less.

This way, in the conductive member 1 for a touch panel, the end part 13B of the first external connection terminal 13 in the width direction is thicker than the center portion 13A, and the thickness D3 of the center portion 13A and the thickness D4 of the end part 13B in the first external connection terminal 13 satisfy Inequality (2). Therefore, due to a difference in height between the center portion 13A and the end part 13B, even in a case where the first external connection terminal 13 is rubbed with another thing, only the end part 13B of the first external connection terminal 13 in the width direction is mainly rubbed, the rubbing of the center portion 13A is suppressed, and scratching on the center portion 13A is suppressed. The center portion 13A of the first external connection terminal 13 occupies a larger range in the width direction than the end part 13B. Therefore, by suppressing scratching on the center portion 13A, a failure such as a significant increase in the electric resistance of the first external connection terminal 13 is suppressed.

Although not shown in the drawing and the detailed description will not be made, in the second lead wire 22 of the second conductive layer 3B, as in the first lead wire 12 of the first conductive layer 3A, an end part of the second lead wire 22 in a width direction is thicker than a center portion of the second lead wire 22 in the width direction, and a ratio of a thickness E2 of the end part to a thickness E1 of the center portion in the second lead wire 22 is 1.50 or more. That is, the thickness E1 of the center portion and the thickness E2 of the end part in the second lead wire 22 satisfy Inequality (3).

$$E2/E1 \geq 1.50 \quad (3)$$

In addition, in the second external connection terminal 23 of the second conductive layer 3B, as in the first external connection terminal 13 of the first conductive layer 3A, an end part of the second external connection terminal 23 in a width direction is preferably thicker than a center portion of the second external connection terminal 23 in the width direction, and a ratio of a thickness E4 of the end part to a thickness E3 of the center portion in the second external connection terminal 23 is preferably 1.50 or more. That is, the thickness E3 of the center portion and the thickness E4 of the end part in the second external connection terminal 23 preferably satisfy Inequality (4).

$$E4/E3 \geq 1.50 \quad (4)$$

Therefore, even in a case where a surface of the conductive member 1 for a touch panel on the second conductive layer 3B side is rubbed with another thing, the rubbing of the center portion of the second lead wire 22 in the width direction and the center portion of the second external connection terminal 23 in the width direction is suppressed, and a failure such as a significant increase in the electric resistance of the second lead wire 22 and a failure such as a significant increase in the electric resistance of the second external connection terminal 23 are suppressed.

As described above, in the conductive member 1 for a touch panel according to the embodiment of the present invention, the thickness D1 of the center portion 12A and the thickness D2 of the end part 12B in the first lead wire 12 satisfy Inequality (1), and the thickness E1 of the center portion and the thickness E2 of the end part in the second lead wire 22 satisfy Inequality (3). Therefore, even in a case where the first lead wire 12 and the second lead wire 22 are rubbed with another thing, the rubbing of the center portion 12A of the first lead wire 12 and the center portion of the second lead wire 22 is suppressed, and a failure such as a significant increase in the electric resistances of the first lead wire 12 and the second lead wire 22 is suppressed.

In addition, in the conductive member 1 for a touch panel according to the embodiment of the present invention, the thickness D3 of the center portion 13A and the thickness D4 of the end part 13B in the first external connection terminal 13 satisfy Inequality (2), and the thickness E3 of the center portion and the thickness E4 of the end part in the second external connection terminal 23 satisfy Inequality (4). Therefore, even in a case where the first external connection terminal 13 and the second external connection terminal 23 are rubbed with another thing, the rubbing of the center portion 13A of the first external connection terminal 13 and the center portion of the second external connection terminal 23 is suppressed, and a failure such as a significant increase in the electric resistances of the first external connection terminal 13 and the second external connection terminal 23 is suppressed.

Figure 6:
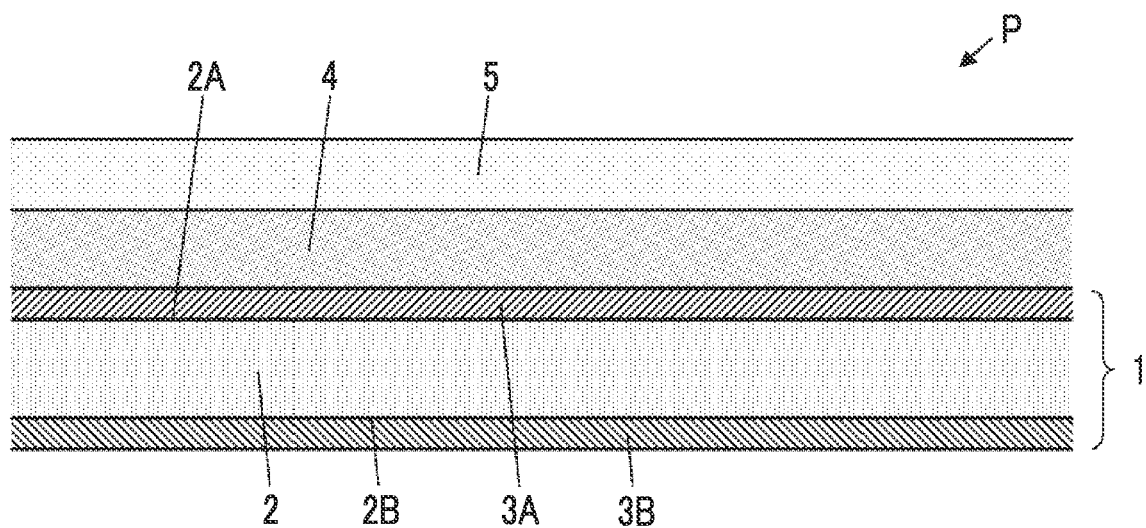
FIG. 6 is a partial cross-sectional view showing a touch panel according to the first embodiment.

In addition, a touch panel P can be formed, for example, by bonding a transparent cover member 5 to the conductive member 1 for a touch panel through a pressure sensitive adhesive 4 as shown in FIG. 6. For example, even in a case where the conductive member 1 for a touch panel is rubbed with another thing during the manufacturing of the touch panel P, the thickness D1 of the center portion 12A and the thickness D2 of the end part 12B in the first lead wire 12 satisfy Inequality (1), the thickness D3 of the center portion 13A and the thickness D4 of the end part 13B in the first external connection terminal 13 satisfy Inequality (2), the thickness E1 of the center portion and the thickness E2 of the end part in the second lead wire 22 satisfy Inequality (3), and the thickness E3 of the center portion and the thickness E4 of the end part in the second external connection terminal 23 satisfy Inequality (4). As a result, a failure such as a significant increase in the electric resistances of the first lead wire 12, the first external connection terminal 13, the second lead wire 22, and the second external connection terminal 23 is suppressed, and thus the touch panel P where this failure is suppressed can be obtained.

In a case where the touch panel P manufactured using the conductive member 1 for a touch panel is disposed on a display module (not shown), it is preferable that the substrate 2 is a transparent insulating substrate such that a user of the touch panel P can check an image displayed on the display module. In this case, it is preferable that the substrate 2 has, a total light transmittance of 85% to 100%. The total light transmittance is measured using "Plastics—Determination of Total Luminous Transmittance And Reflectance" defined by JIS K 7375:2008.

In addition, in the above description, the ratio D2/D1 of the thickness D2 of the end part 12B to the thickness D1 of the center portion 12A in the first lead wire 12 is 1.50 or more. In order to suppress the rubbing of the center portion 12A of the first lead wire 12, the ratio D2/D1 is more preferably 1.55 or more. That is, it is more preferable that the ratio D2/D1 satisfies Inequality (5).

$$D2/D1 \geq 1.55 \quad (5)$$

In addition, as in the ratio D2/D1 of the thickness D2 of the end part 12B to the thickness D1 of the center portion 12A in the first lead wire 12, the ratio D4/D3 of the thickness D4 of the end part 22B to the thickness D3 of the center portion 22A in the second lead wire 22 is also more preferably 1.55 or more in order to suppress the rubbing of the center portion 22A of the second lead wire 22. That is, it is more preferable that the ratio D4/D3 satisfies Inequality (6).

$$D4/D3 \geq 1.55 \quad (6)$$

In addition, the first lead wire 12 that satisfies Inequality (1) and the second lead wire 22 that satisfies Inequality (3) can be manufactured, for example, using a so-called plating method where various conditions such as a composition of a plating liquid, a temperature of the plating liquid, and a time for which the substrate 2 is dipped in the plating liquid are adjusted. In this case, by designing the line width W1 of the first lead wire 12 and the line width of the second lead wire 22 to be in a range of 3.0 μm or more and 30.0 μm or less, precipitation of a conductive material on the end part 12B of the first lead wire 12 and the end part of the second lead wire 22 progresses further than precipitation of a conductive material on the center portion 12A of the first lead wire 12 and the center portion of the second lead wire 22, and the ratio D2/D1 of the thickness D2 of the end part 12B to the thickness D1 of the center portion 12A in the first lead wire 12 and the ratio E2/E1 of the thickness E2 of the end part to the thickness E1 of the center portion in the second lead wire 22 can be further increased. As a result, the rubbing of the center portion 12A of the first lead wire 12 and the center portion of the second lead wire 22 is suppressed.

In addition, the first external connection terminal 13 that satisfies Inequality (2) and the second external connection terminal 23 that satisfies Inequality (4) can be manufactured using a plating method, for example, as in the first lead wire 12 that satisfies Inequality (1) and the second lead wire 22 that satisfies Inequality (3).

In this case, by designing the terminal width W2 of the first external connection terminal 13 and the terminal width of the second external connection terminal 23 to be in a range of 300.0 μm or more and 500.0 μm or less, precipitation of a conductive material on the end part 13B of the first external connection terminal 13 and the end part of the second external connection terminal 23 progresses further than precipitation of a conductive material on the center portion 13A of the first external connection terminal 13 and the center portion of the second external connection terminal 23, and the ratio D4/D3 of the thickness D4 of the end part 13B to the thickness D3 of the center portion 13A in the first external connection terminal 13 and the ratio E4/E3 of the thickness E4 of the end part to the thickness E3 of the center portion in the second external connection terminal 23 can be further increased. As a result, the rubbing of the center portion 13A of the first external connection terminal 13 and the center portion of the second external connection terminal 23 is further suppressed.

In addition, in the above description, the first conductive layer 3A is disposed on the first surface 2A of the substrate 2, and the second conductive layer 3B is disposed on the second surface 2B of the substrate 2. However, both of the first conductive layer 3A and the second conductive layer 3B may be disposed on only the first surface 2A side or only the second surface 2B side of the substrate 2, for example, a configuration where the second conductive layer 3B is disposed on the first conductive layer 3A through an insulating layer.

In addition, in the above description, the conductive member 1 for a touch panel includes the first conductive layer 3A and the second conductive layer 3B. However, the conductive member 1 for a touch panel may include only any one of the first conductive layer 3A or the second conductive layer 3B.

In either case, the first conductive layer 3A or the second conductive layer 3B is disposed on only one surface of the substrate 2.

Hereinafter, each of the members forming the conductive member 1 for a touch panel according to the embodiment will be described.

Substrate 2

The kind of the substrate 2 is not particularly limited as long as it is a member that can support the first conductive layer 3A and the second conductive layer 3B. Examples of the substrate 2 include a plastic substrate, a glass substrate, and a metal substrate. Among these, a plastic substrate is preferable.

As the substrate 2, a substrate having flexibility is preferable from the viewpoint of excellent bendability. Examples of the substrate having flexibility include the plastic substrate.

The thickness of the substrate 2 is not particularly limited and is preferably 25 µm to 500 µm.

As a material forming the substrate 2, a resin having a melting point of about 290° C. or lower such as polyethylene terephthalate (PET) (258° C.), polycycloolefin (134° C.), polycarbonate (250° C.), an acrylic film (128° C.), polyethylene naphthalate (269° C.), polyethylene (135° C.), polypropylene (163° C.), polystyrene (230° C.), polyvinyl chloride (180° C.), polyvinylidene chloride (212° C.), or triacetyl cellulose (290° C.) is preferable, and PET, polycycloolefin, or polycarbonate is more preferable.

In particular, PET is preferable from the viewpoint of excellent adhesiveness between the first conductive layer 3A and the second conductive layer 3B. The numerical value in the brackets is the melting point or the glass transition temperature.

The total light transmittance of the substrate 2 is preferably 85% to 100%. The total light transmittance is measured using "Plastics—Determination of Total Luminous Transmittance and Reflectance" defined by Japanese Industrial Standards (JIS) K 7375:2008.

Examples of a suitable aspect of the substrate 2 include a treated substrate that undergoes at least one treatment selected from the group consisting of an atmospheric pressure plasma treatment, a corona discharge treatment, and an ultraviolet irradiation treatment. By performing the above-described treatment, a hydrophilic group such as an OH group is introduced into the treated surface of the substrate 2 such that such that the adhesiveness between the substrate 2 and the first conductive layer 3A and the adhesiveness between the substrate 2 and the second conductive layer 3B are improved. In addition, the atmospheric pressure plasma treatment is preferable among the above-described treatments from the viewpoint of further improving the adhesiveness between the substrate 2 and the first conductive layer 3A and the adhesiveness between the substrate 2 and the second conductive layer 3B.

Undercoat Layer

In order to improve the adhesiveness between the substrate 2 and the first conductive layer 3A and the adhesiveness between the substrate 2 and the second conductive layer 3B, an undercoat layer can also be disposed between the substrate 2 and the first conductive layer 3A and between the substrate 2 and the second conductive layer 3B. This undercoat layer includes a polymer such that the adhesiveness between the substrate 2 and the first conductive layer 3A and the adhesiveness between the substrate 2 and the second conductive layer 3B are further improved.

A method of forming the undercoat layer is not particularly limited, and examples thereof include a method of applying a composition for forming an undercoat layer including a polymer to the substrate and optionally performing a heat treatment thereon. In addition, as a composition for forming an undercoat layer including a polymer, for example, gelatin, an acrylic resin, a urethane resin, or an acrylic styrene latex including fine particles of an inorganic material or a polymer may be used.

Optionally, in the conductive member 1 for a touch panel, as a layer other than the above-described undercoat layer, a refractive index adjusting layer may be provided between the substrate 2 and the first conductive layer 3A and between the substrate 2 and the second conductive layer 3B. As the refractive index adjusting layer, for example, an organic layer to which particles of a metal oxide such as zirconium oxide for adjusting a refractive index can be used.

First Conductive Layer and Second Conductive Layer

As a material for forming the first conductive layer 3A and the second conductive layer 3B, a metal or an alloy can be used. For example, the first conductive layer 3A and the second conductive layer 3B can be formed of silver, copper, gold, aluminum, nickel, chromium, molybdenum, or tungsten. It is preferable that the first conductive layer 3A and the second conductive layer 3B include copper. However, the first conductive layer 3A and the second conductive layer 3B may include a metal other than copper, for example, gold or silver. In addition, the first conductive layer 3A and the second conductive layer 3B may include metallic silver, gelatin, or a polymer binder such as an acrylic styrene latex that is suitable for forming a mesh pattern. Other preferable examples of the material include a metal and an alloy of aluminum, silver, molybdenum, and titanium. In addition, a laminated structure of the materials may be used. For example, a fine metal wire having a laminated structure such as molybdenum/copper/molybdenum or molybdenum/aluminum/molybdenum can be used.

Further, for example, the first conductive layer 3A and the second conductive layer 3B may include metal oxide particles, a metal paste such as a silver paste or a copper paste, or metal nanowire particles such as silver nanowire or copper nanowire.

Next, a method of forming the first conductive layer 3A and the second conductive layer 3B will be described. As the method of forming the first conductive layer 3A and the second conductive layer 3B, for example, a sputtering method, a plating method, a silver halide method, or a printing method can be appropriately used.

A method of forming the first conductive layer 3A and the second conductive layer 3B using a sputtering method will be described. First, by forming a copper foil layer by sputtering and forming a copper wire using the copper foil layer by photolithography, the first conductive layer 3A and the second conductive layer 3B can be formed. The copper foil layer can also be formed by so-called vapor deposition instead of sputtering. As the copper foil layer, an electrolytic copper foil can be used in addition to a sputtered copper foil a vapor deposition copper foil. More specifically, a step of forming copper wires described in JP2014-29614A can be used.

A method of forming the first conductive layer 3A and the second conductive layer 3B using a plating method will be described. For example, the first conductive layer 3A and the second conductive layer 3B can be formed using a metal plating film that is formed on an electroless plating underlayer by performing electroless plating on the underlayer. In this case, the first conductive layer 3A and the second conductive layer 3B are formed by forming a catalyst ink including at least metal fine particles on a substrate in a patterned manner and dipping the substrate in an electroless plating bath to form a metal plating film. More specifically, a method of manufacturing a metal-coated substrate described in JP2014-159620A can be used.

In addition, the first conductive layer 3A and the second conductive layer 3B are formed by forming a resin composition having at least a functional group capable of interacting a metal catalyst precursor on a substrate in a patterned manner, adding a catalyst or catalyst precursor, and dipping the substrate in an electroless plating bath to form a metal plating film. More specifically, a method of manufacturing a metal-coated substrate described in JP2012-144761A can be used.

A method of forming the first conductive layer 3A and the second conductive layer 3B using a silver halide method will be described. First, by exposing a silver halide emulsion layer including silver halide using an exposure pattern for forming the first conductive layer 3A and the second conductive layer 3B and developing the exposed silver halide emulsion layer, the first conductive layer 3A and the second conductive layer 3B can be formed. More specifically, a method of manufacturing the fine metal wire described in JP2012-6377A, JP2014-112512A, JP2014-209332A, JP2015-22397A, JP2016-192200A, or WO2016/157585A can be used.

A method of forming the first conductive layer 3A and the second conductive layer 3B using a printing method will be described. First, by applying a conductive paste including conductive powder to a substrate in the same pattern as the first conductive layer 3A and the second conductive layer 3B and heating the conductive paste, the first conductive layer 3A and the second conductive layer 3B can be formed. The pattern formation using the conductive paste is performed, for example, using an ink jet method or a screen printing method. As the conductive paste, more specifically, a conductive paste described in JP2011-28985A can be used.

Cover Member

As a material of the cover member 5, for example, reinforced glass, polycarbonate, polyethylene terephthalate, or polymethyl methacrylate (PMMA) can be used. The thickness of the cover member 5 is preferably 0.1 mm or more and 1.5 mm or less.

Pressure Sensitive Adhesive

As the pressure sensitive adhesive 4 that bonds the conductive member 1 for a touch panel and the cover member 5 to each other, an optical transparent adhesive sheet (optical clear adhesive: OCA) or an optical transparent adhesive resin (optical clear resin: OCR) can be used, and the thickness thereof is preferably 10 μm or more and 200 μm or less. As the optical transparent adhesive sheet, for example, 8146 series (manufactured by 3M) can be used.

EXAMPLES

The present invention will be described in more detail based on the following examples. Materials, used amounts, ratios, treatment details, and treatment procedures shown in the following examples can be appropriately changed within a range not departing from the scope of the present invention. Accordingly, the scope of the present invention is not limited to the following examples.

Example 1

Preparation of Silver Halide Emulsion

The following solution 2 and the following solution 3 were simultaneously added for 20 minutes to the following solution 1 held at pH 4.5 and 38° C. in amounts corresponding to 90% of the entire amounts while stirring the solution 1. As a result, nuclear particles having a size of 0.16 μm were formed. Next, the following solution 4 and the following solution 5 were added to the obtained solution for 8 minutes, and the remaining 10% amounts of the solution 2 and the solution 3 were further added for 2 minutes. As a result, the nuclear particles grew to a size of 0.21 μm. Further, 0.15 g of potassium iodide was added to the obtained solution, and the particles were aged for 5 minutes. Then the formation of the particles was completed.

Solution 1:

| | |
|---|---|
| Water | 750 ml |
| Gelatin | 8.6 g |
| Sodium chloride | 3 g |
| 1,3-Dimethylimidazolidine-2-thione | 20 mg |
| Sodium benzenethiolsulfonate | 10 mg |
| Citric acid | 0.7 g |

Solution 2:

| | |
|---|---|
| Water | 300 ml |
| Silver nitrate | 150 g |

Solution 3:

| | |
|---|---|
| Water | 300 ml |
| Sodium chloride | 38 g |
| Potassium bromide | 32 g |
| Potassium hexachloroiridate (III) (0.005% KCl 20% aqueous solution) | 5 ml |
| Ammonium hexachlororhodate (0.001% NaCl 20% aqueous solution) | 7 ml |

Solution 4:

| | |
|---|---|
| Water | 100 ml |
| Silver nitrate | 50 g |

Solution 5:

| | |
|---|---|
| Water | 100 ml |
| Sodium chloride | 13 g |
| Potassium bromide | 11 g |
| Yellow prussiate of potash | 5 mg |

Next, the particles were cleaned with water by flocculation using an ordinary method. Specifically, the temperature of the obtained solution was decreased to 35° C., and the pH was decreased (to be in a range of pH 3.6±0.2) using sulfuric acid until silver halide precipitated. Next, about 3 L of the supernatant solution was removed from the obtained solution (first water cleaning). Next, 3 L of distilled water was added to the solution from which the supernatant solution was removed, and sulfuric acid was added until silver halide precipitated. About 3 L of the supernatant solution was removed again from the obtained solution (second water cleaning). By repeating the same operation as the second water cleaning once more (third water cleaning), the water cleaning and desalting step was completed. After the water cleaning and desalting, the emulsion was adjusted to pH 6.4 and pAg 7.5, 2.5 g of gelatin, 10 mg of sodium benzenethiolsulfonate, 3 mg of sodium benzenethiosulfinate, 15 mg of sodium thiosulfate, and 10 mg of chloroauric acid were added, and chemosensitization was performed at 55° C. to obtain the optimum sensitivity. Next, 100 mg of 1,3,3a,7-tetraazaindene as a stabilizer and 100 mg of PROXEL (trade name, manufactured by ICI Co., Ltd.) as a preservative were further added to the obtained emulsion. The finally obtained emulsion was a silver chlorobromide cubic particle emulsion having an average particle diameter (sphere equivalent diameter) of 200 nm and a coefficient of variation of 9%, in which the content of silver iodide was 0.08 mol %, and the ratio of silver chlorobromide was 70 mol % of silver chloride/30 mol % of silver bromide.

Preparation of Composition for Forming Photosensitive Layer 1,3,3a,7-tetraazaindene ($1.2 \times 10^{-4}$ mol/mol Ag), hydroquinone ($1.2 \times 10^{-2}$ mol/mol Ag), citric acid ($3.0 \times 10^{-4}$ mol/mol Ag), 2,4-dichloro-6-hydroxy-1,3,5-triazine sodium salt (0.90 g/mol Ag), and a small amount of a hardening agent were added to the emulsion to obtain a composition. Next, the pH of the composition was adjusted to 5.6 using citric acid.

A polymer latex (a ratio (mass of dispersant/mass of polymer 1; unit: g/g) of the mass of the dispersant to the mass of a polymer 1 was 0.02 and the solid content was 22 mass %) including a polymer represented by (P-1) (hereinafter, also referred to as "polymer 1"), a dispersant formed of dialkylphenyl polyethylene oxide (PEO) sulfuric acid ester, and water was added to the above-described composition such that a ratio (mass of polymer 1/mass of gelatin; unit: g/g) of the mass of the polymer 1 to the total mass of the gelatin in the composition was 0.25/1. As a result, a polymer latex-containing composition was obtained. Here, in the polymer latex-containing composition, a ratio (mass of gelatin/mass of silver derived from silver halide; unit: g/g) of the mass of the gelatin to the mass of silver derived from silver halide was 0.11.

Further, EPOXY RESIN DY022 (trade name, manufactured by Nagase ChemteX Corporation) as a crosslinking agent was added. The addition amount of the crosslinking agent was adjusted such that the amount of the crosslinking agent in the silver halide-containing photosensitive layer described below was 0.09 g/m$^2$.

This way, the composition for forming a photosensitive layer was prepared.

The polymer 1 was synthesized, for example, with respect to JP3305459B and JP3754745B.

Formation of Undercoat Layer

The above-described polymer latex was applied to a surface of a substrate formed of a polyethylene terephthalate film (a roll-shaped elongated film, manufactured by FUJIFILM Corporation) having a thickness of 40 μm, and an undercoat layer having a thickness of 0.05 μm was provided. This treatment was performed by roll-to-roll, and each of the following treatments (steps) was also performed by roll-to-roll. In this case, in the roll, the width was 1 m, and the length was 1000 m.

Step A

Next, a composition for forming a silver halide non-containing layer obtained by mixing the polymer latex and gelatin, the above-described composition for forming a photosensitive layer, and a composition for forming a protective layer obtained by mixing the polymer latex and gelatin were simultaneously applied to the undercoat layer to form a silver halide non-containing layer, a silver halide-containing photosensitive layer, and a protective layer on the undercoat layer.

The thickness of the silver halide non-containing layer was 2.0 μm, the mixing mass ratio (polymer 1/gelatin) of the polymer 1 to the gelatin in the silver halide non-containing layer was 2/1, and the content of the polymer 1 was 1.3 g/m$^2$.

In addition, the thickness of the silver halide-containing photosensitive layer was 2.5 μm, the mixing mass ratio (polymer 1/gelatin) of the polymer 1 to the gelatin in the silver halide-containing photosensitive layer was 0.25/1, and the content of the polymer 1 was 0.19 g/m$^2$.

In addition, the thickness of the protective layer was 0.15 μm, the mixing mass ratio (polymer 1/gelatin) of the polymer 1 to the gelatin in the protective layer was 0.1/1, and the content of the polymer 1 was 0.015 g/m$^2$.

Step B

The prepared photosensitive layer was exposed to parallel light from a high pressure mercury lamp as a light source through a photomask having a pattern corresponding to the first conductive layer 3A including the plurality of first detection electrodes 11, the plurality of first lead wires 12, and the plurality of first external connection terminals 13 as shown in FIGS. 2 and 3.

After the exposure, the obtained sample was developed with a developer described below and was further developed using a fixing solution (trade name; N3X-R for CN16X, manufactured by FUJIFILM Corporation). Next, the sample was rinsed with pure water at 25° C. and was dried. As a result, the sample including the first conductive layer including metallic silver was obtained.

Composition of Developer

1 L of the developer included the following compounds.

| | |
|---|---|
| Hydroquinone | 0.037 mol/L |
| N-methylamino phenol | 0.016 mol/L |
| Sodium metaborate | 0.140 mol/L |
| Sodium hydroxide | 0.360 mol/L |
| Sodium bromide | 0.031 mol/L |
| Potassium metabisulfite | 0.187 mol/L |

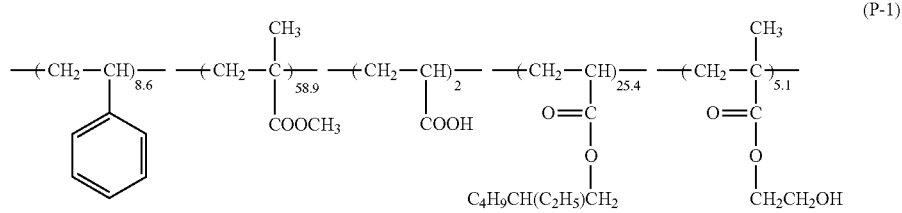

The obtained sample was dipped in warm water at 50° C. for 180 seconds. Next, water was drained by air shower, and the sample A was naturally dried.

Step C

The sample obtained in the step B was transported into a superheated steam treatment bath at 110° C., was left to stand for 30 seconds, and was treated with superheated steam. In this case, the flow rate of the steam was 100 kg/h.

Step D

The sample obtained in the step C was dipped in an aqueous proteolytic enzyme solution (40° C.) for 30 seconds. The sample was taken out from the aqueous proteolytic enzyme solution, was dipped in warm water (liquid temperature: 50° C.) for 120 seconds, and was cleaned. Next, water was drained by air shower, and the sample was naturally dried.

The used aqueous proteolytic enzyme solution was prepared according to the following procedure.

Triethanolamine and sulfuric acid were added to an aqueous solution (concentration of protease: 0.5 mass %) of protease (BIOPRASE 30 L, manufactured by Nagase ChemteX Corporation) to adjust the pH to 8.5.

Step E

The sample obtained in the step D of Example 1 was dipped in a plating liquid (30° C.) having the following composition for 4 hours. The sample was taken out from the plating liquid, was dipped in warm water (50° C.) for 120 seconds, and was cleaned.

The composition of the plating liquid (total amount: 1200 ml) was as shown below. The pH of the plating liquid was 9.9, and was adjusted by adding a predetermined amount of potassium carbonate (manufactured by FUJIFILM Wako Pure Chemical Corporation) thereto. In addition, as all of the following components used, products manufactured by FUJIFILM Wako Pure Chemical Corporation were used.

Composition of Plating Liquid

| | |
|---|---|
| $AgNO_3$ | 2.1 g |
| Sodium sulfite | 86 g |
| Sodium thiosulfate pentahydrate | 50 g |
| ARON T-50 (manufactured by TOAGOSEI Co., Ltd., concentration of solid contents: 40%) | 36 g |
| Methylhydroquinone | 13 g |
| Potassium carbonate | a predetermined amount |
| Water | remainder |

Step G

The sample obtained in the step D was transported into a superheated steam treatment bath at 110° C., was left to stand for 30 seconds, and was treated with superheated steam. In this case, the flow rate of the steam was 100 kg/h.

Step P

The sample obtained in the step G was dipped in a treatment liquid A (25° C.) for 90 seconds. The sample was taken out from the treatment liquid A, was dipped in water at 25° C. for 30 seconds, and was cleaned. The composition of the treatment liquid A (total amount: 1200 g) was as shown below. In addition, as all of the following components used, products manufactured by FUJIFILM Wako Pure Chemical Corporation were used.

Composition of Treatment Liquid A

| | |
|---|---|
| 2-mercaptobenzimidazole | 2.4 g |
| Ethanol | 600 g |
| Water | remainder |

Drying Step

The sample obtained in the step P was heated at 65° C. for 90 seconds and dried.

Through the above-described steps, a conductive member for a touch panel according to Example 1 was prepared.

By performing the following (Conductive Treatment Step) and (Cutting and Observation Step) on the conductive member for a touch panel according to Example 1, the thickness D1 of the center portion 12A and the thickness of the end part 12B in the first lead wire 12 of Example 1 were measured, and the ratio D2/D of the thickness D2 of the end part 12B to the thickness D1 of the center portion 12A was calculated.

Conductive Treatment Step

Carbon having a thickness of 10 nm was vapor-deposited on the first conductive layer 3A using a vacuum deposition device (IB-29510VET, manufactured by JEOL Ltd.). Next, platinum having a thickness of 10 nm was vapor-deposited on the carbon having a thickness of 10 nm using a sputtering vapor deposition device (E-1030 ion sputter, manufactured by Hitachi Ltd.)

Cutting and Observation Step

Any 10 positions in the plurality of first lead wires 12 were selected. Next, using a FIB function of a focused ion beam (FIB)-scanning electron microscope (SEM) composite device (Helios 600i, manufactured by Thermo Fisher Scientific Inc.), cross-section cutting was performed on the selected 10 positions under conditions of a $Ga^+$ acceleration voltage of 30 kV and a surface protective film Pt-CVD. As a result, at each of the selected 10 positions, a cross-section of the first lead wire that was cut along a surface perpendicular to the extending direction of the first lead wire 12 as shown in FIG. 4 was exposed.

Further, using a SEM function of the same FIB-SEM composite device, the cross-sections of the exposed 10 positions in the first lead wires 12 were observed under conditions of a secondary backscattered electron image, an acceleration voltage of 1 kV, a probe current of 86 pA, and W.D. 4 mm, and the thickness D1 of the center portion 12A and the thickness D2 of the end part 12B in the first lead wire 12 at each of the 10 positions were measured.

Finally, the average value of the thicknesses D1 of the center portions 12A of the first lead wires 12 measured at the 10 positions was calculated to obtain a final value of the thickness D1 of the center portion 12A, and the average value of the thicknesses D2 of the end parts 12B of the first lead wires 12 measured at the 10 positions was calculated to obtain a final value of the thickness D2 of the end part 12B. In addition, the ratio D2/D1 of the final thickness D2 of the end part 12B to the final thickness D1 of the center portion 12A in the first lead wire 12 obtained as described above was calculated.

As a result of the calculation, the thickness D1 of the center portion 12A of the first lead wire 12 was 1.00 μm, the thickness D2 of the end part 12B of the first lead wire 12 was 1.50 μm, and the thickness ratio D2/D1 was 1.50.

Example 2

A conductive member for a touch panel according to Example 2 was prepared using the same method as that of Example 1, except that in the composition of the plating liquid used in the step E, the amount of sodium thiosulfate pentahydrate was changed to 60 g and the amount of methylhydroquinone was changed to 15 g.

Using the same method as that of Example 1, the thickness D1 of the center portion 12A and the thickness D2 of the end part 12B in the first lead wire 12 of Example 2 were measured, and the thickness ratio D2/D1 was calculated. In the first lead wire 12 according to Example 2, the thickness D1 of the center portion 12A was 1.10 μm, the thickness D2 of the end part 12B was 1.70 μm, and the thickness ratio D2/D1 was 1.55.

Example 3

A conductive member for a touch panel according to Example 3 was prepared using the same method as that of Example 1, except that in the composition of the plating liquid used in the step E, the amount of sodium thiosulfate pentahydrate was changed to 60 g, the temperature of the plating liquid was changed to 35° C., and the sample obtained in the step D was dipped in the plating liquid for 5 minutes.

Using the same method as that of Example 1, the thickness D1 of the center portion 12A and the thickness D2 of the end part 12B in the first lead wire 12 of Example 3 were measured, and the thickness ratio D2/D1 was calculated. In the first lead wire 12 according to Example 3, the thickness D1 of the center portion 12A was 1.20 µm, the thickness D2 of the end part 12B was 2.20 µm, and the thickness ratio D2/D1 was 1.83.

Comparative Example 1

A conductive member for a touch panel according to Comparative Example 1 was prepared using the same method as that of Example 1, except that in the composition of the plating liquid used in the step E, the amount of sodium thiosulfate pentahydrate was changed to 60 g and the sample obtained in the step D was dipped in the plating liquid for 5 minutes. The composition of the plating liquid used in the step E of Comparative Example 1 was the same as the composition of the plating liquid used in the step E of Example 3.

Using the same method as that of Example 1, the thickness D1 of the center portion 12A and the thickness D2 of the end part 12B in the first lead wire 12 of Comparative Example 1 were measured, and the thickness ratio D2/D1 was calculated. In the first lead wire 12 according to Comparative Example 1, the thickness D1 of the center portion 12A was 1.20 µm, the thickness D2 of the end part 12B was 1.60 µm, and the thickness ratio D2/D1 was 1.33.

Comparative Example 2

A conductive member for a touch panel according to Comparative Example 1 was prepared using the same method as that of Example 1, except that in the composition of the plating liquid used in the step E, the amount of sodium thiosulfate pentahydrate was changed to 60 g, the amount of methylhydroquinone was changed to 11 g, and the sample obtained in the step D was dipped in the plating liquid for 6 minutes.

Using the same method as that of Example 1, the thickness D1 of the center portion 12A and the thickness D2 of the end part 12B in the first lead wire 12 of Comparative Example 2 were measured, and the thickness ratio D2/D1 was calculated. In the first lead wire 12 according to Comparative Example 2, the thickness D1 of the center portion 12A was 1.10 µm, the thickness D2 of the end part 12B was 1.30 µm, and the thickness ratio D2/D1 was 1.18.

Comparative Example 3

A conductive member for a touch panel according to Comparative Example 3 was prepared using the same method as that of Example 1, except that in the composition of the plating liquid used in the step E, the amount of sodium thiosulfate pentahydrate was changed to 60 g, the temperature of the plating liquid was changed to 25° C., and the sample obtained in the step D was dipped in the plating liquid for 6 minutes. The composition of the plating liquid used in the step E of Comparative Example 3 was the same as the composition of the plating liquid used in the step E of Example 3 and Comparative Example 1.

Using the same method as that of Example 1, the thickness D1 of the center portion 12A and the thickness D2 of the end part 12B in the first lead wire 12 of Comparative Example 3 were measured, and the thickness ratio D2/D1 was calculated. In the first lead wire 12 according to Comparative Example 3, the thickness D1 of the center portion 12A was 1.70 µm, the thickness D2 of the end part 12B was 2.10 µm, and the thickness ratio D2/D1 was 1.24.

Regarding the conductive members for a touch panel according to Examples 1 to 3 and Comparative Examples 1 to 3 manufactured as described above, the evaluation of the following resistance increase rate was performed.

Evaluation of Resistance Increase Rate

First, among the plurality of first lead wires 12 of the conductive member for a touch panel, first wire resistance values of freely selected first lead wires 12 were measured. In this case, four microprobes (tungsten probes manufactured by Micro Support Co., Ltd., diameter: 0.5 µm) were brought into contact with four different positions along the extension direction of the selected first lead wires 12, respectively. Next, a constant current was caused to flow through two microprobes positioned on opposite ends of the outer side using a source meter (2400 general-purpose source meter, manufactured by Keithley Instruments Inc.) such that a voltage between two microprobes positioned on the inner side was 5 mV, and a resistance value between the two microprobes positioned on the inner side was measured. Further, by dividing the measured resistance value by the distance between the two microprobes positioned on the inner side, the first wire resistance value of the first lead wire 12 was calculated.

Next, the conductive member for a touch panel was disposed on a flat table, and dustless paper (RN72 light blue, manufactured by Oji F-Tex Co., Ltd.) was disposed on the plurality of first lead wires. Next, by loading a weight on the dustless paper, a vertical load of 100 g/cm$^2$ was applied to the plurality of first lead wires 12 through the dustless paper. Next, by reciprocating the dustless paper and the weight together by a predetermined distance five times to pass through the plurality of first lead wires 12 in the horizontal direction at a rate of 5 cm/sec, the surfaces of the plurality of first lead wires 12 were rubbed.

Next, using the same method as the method of measuring the first wire resistance value of the first lead wire 12, a second wire resistance value of the first lead wire 12 rubbed with the loaded dustless paper was measured.

Finally, by calculating (Second Wire Resistance Value)/(First Wire Resistance Value)×100%, the resistance increase rate of the first lead wire 12 was calculated. A case where a failure caused by scratching on the first lead wire 12 did not occur in the conductive member for a touch panel having a resistance increase rate of less than 5% was evaluated as A, and a case where a failure caused by scratching on the first lead wire 12 occurred in the conductive member for a touch panel having a resistance increase rate of 5% or more was evaluated as B.

In Example 1 measured in the evaluation of the resistance increase rate, the first wire resistance value was 20.01 Ω/mm, the second wire resistance value was 20.31 Ω/mm, and the resistance increase rate was 1.50%. In Example 2, the first wire resistance value was 20.04 Ω/mm, the second wire resistance value was 20.13 Ω/mm, and the resistance increase rate was 0.45%. In Example 3, the first wire resistance value was 20.10 Ω/mm, the second wire resistance value was 20.21 Ω/mm, and the resistance increase rate was 0.55%.

In Comparative Example 1, the first wire resistance value was 19.99 Ω/mm, the second wire resistance value was 21.37 Ω/mm, and the resistance increase rate was 6.90%. In Comparative Example 2, the first wire resistance value was 20.06 Ω/mm, the second wire resistance value was 21.59 Ω/mm, and the resistance increase rate was 7.63%. In Comparative Example 3, the first wire resistance value was 20.01 Ω/mm, the second wire resistance value was 21.22 Ω/mm, and the resistance increase rate was 6.05%.

Table 1 below shows the results of the evaluation of the resistance increase rate for Examples 1 to 3 and Comparative Examples 1 to 3.

TABLE 1

|  | Thickness D1 of Center Portion | Thickness D2 of End Part | Ratio D2/D1 | Resistance Increase Rate | Evaluation of Resistance Increase Rate |
|---|---|---|---|---|---|
| Example 1 | 1.00 μm | 1.50 μm | 1.50 | 1.50% | A |
| Example 2 | 1.10 μm | 1.70 μm | 1.55 | 0.45% | A |
| Example 3 | 1.20 μm | 2.20 μm | 1.83 | 0.55% | A |
| Comparative Example 1 | 1.20 μm | 1.60 μm | 1.33 | 6.90% | B |
| Comparative Example 2 | 1.10 μm | 1.30 μm | 1.18 | 7.63% | B |
| Comparative Example 3 | 1.70 μm | 2.10 μm | 1.24 | 6.05% | B |

As can be seen in Table 1, it can be seen that, in the conductive members for a touch panel according to Examples 1 to 3, the evaluation results of the resistance increase rate were all A, and a failure caused by scratching was suppressed. It is presumed that, in all of the conductive members for a touch panel according to Examples 1 to 3, the ratio D2/D1 of the thickness D2 of the end part 12B to the thickness D1 of the center portion 12A in the first lead wire 12 was 1.50 or more, and even in a case where the first lead wire 12 was rubbed with the dustless paper, the end part 12B was mainly rubbed, and scratching on the center portion 12A was suppressed.

In addition, it can be seen that the resistance increase rate of Example 2 was 0.45%, the resistance increase rate of Example 3 was 0.55%, and both of the resistance increase rates were significantly suppressed. Therefore, it can be seen that the ratio D2/D1 of the thickness D2 of the end part 12B to the thickness D1 of the center portion 12A in the first lead wire 12 is more preferably 1.55 or more.

On the other hand, it can be seen that, in the conductive members for a touch panel according to Comparative Examples 1 to 3, the evaluation results of the resistance increase rate were all B, and a failure caused by scratching occurred. It is presumed that, in all of the conductive members for a touch panel according to Comparative Examples 1 to 3, the ratio D2/D1 of the thickness D2 of the end part 12B to the thickness D1 of the center portion 12A in the first lead wire 12 was less than 1.50, and in a case where the first lead wire 12 was rubbed with the dustless paper, the center portion 12A was likely to be rubbed, and the wire resistance value of the first lead wire 12 was likely to increase.

Basically, the present invention is configured as described above. Hereinabove, the conductive member for a touch panel according to the embodiment of the present invention has been described in detail. However, the present invention is not limited to the above-described examples, and various improvements or modifications can be made within a range not departing from the scope of the present invention.

EXPLANATION OF REFERENCES

1: conductive member for a touch panel
2: substrate
2A: first surface
2B: second surface
3A: first conductive layer
3B: second conductive layer
4: pressure sensitive adhesive
5: cover member
11: first detection electrode
12: first lead wire
12A: center portion
12B: end part
13: first external connection terminal
21: second detection electrode
22: second lead wire
23: second external connection terminal
D1, D2, D3, D4: thickness
L1, L2, R1, R2: range
P: touch panel
S1, S2: side edge surface
W1: line width
W2: terminal width

What is claimed is:

1. A conductive member for a touch panel, comprising:
a substrate having a first smooth surface and a second smooth surface which form a front and a back; and
a conductive layer that is disposed on at least one surface among the first smooth surface and the second smooth surface of the substrate,
wherein the conductive layer includes a plurality of detection electrodes and a plurality of lead wires led from the plurality of detection electrodes,
wherein the lead wire is disposed on the at least one surface,
wherein an end part of the lead wire in a width direction is thicker than a center portion of the lead wire in the width direction, and
wherein a ratio of a thickness of the end part of the lead wire to a thickness of the center portion of the lead wire is 1.50 or more.

2. The conductive member for a touch panel according to claim 1,
wherein the ratio of the thickness of the end part of the lead wire to the thickness of the center portion of the lead wire is 1.55 or more.

3. The conductive member for a touch panel according to claim 1,
wherein a line width of the lead wire is 3.0 μm or more and 30.0 μm or less.

4. The conductive member for a touch panel according to claim 1,
wherein the thickness of the end part is a maximum thickness of the lead wire in a range of a predetermined distance from a side edge surface of the lead wire in the width direction to the center portion.

5. The conductive member for a touch panel according to claim 4,
wherein the predetermined distance is 1.0 μm.

6. The conductive member for a touch panel according to claim 1, wherein the conductive layer includes a plurality of external connection terminals connected to the plurality of lead wires,
an end part of the external connection terminal in a width direction is thicker than a center portion of the external connection terminal in the width direction, and
a ratio of a thickness of the end part of the external connection terminal to a thickness of the center portion of the external connection terminal is 1.50 or more.

7. The conductive member for a touch panel according to claim 1,
wherein the substrate is a transparent insulating substrate.

8. A touch panel comprising:
the conductive member for a touch panel according to claim 1.

* * * * *